United States Patent
Tseng

(10) Patent No.: US 9,560,664 B2
(45) Date of Patent: Jan. 31, 2017

(54) METHOD AND APPARATUS FOR DL-UL (DOWNLINK-UPLINK) INTERFERENCE MANAGEMENT AND TRAFFIC ADAPTATION

(71) Applicant: INNOVATIVE SONIC CORPORATION, Taipei (TW)

(72) Inventor: Li-Chih Tseng, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 121 days.

(21) Appl. No.: 14/505,891

(22) Filed: Oct. 3, 2014

(65) Prior Publication Data

US 2015/0098380 A1    Apr. 9, 2015

Related U.S. Application Data

(60) Provisional application No. 61/886,814, filed on Oct. 4, 2013.

(51) Int. Cl.
*H04W 72/08* (2009.01)
*H04W 76/04* (2009.01)
(Continued)

(52) U.S. Cl.
CPC .......... *H04W 72/082* (2013.01); *H04L 5/0078* (2013.01); *H04W 28/0221* (2013.01);
(Continued)

(58) Field of Classification Search
CPC ................. H04W 28/0221; H04W 52/0216; H04W 56/001–56/0025; H04W 72/082; H04W 72/12–72/14; H04W 72/00; H04W 74/08; H04W 74/00; H04W 76/046; H04W 76/048; H04W 76/45–76/48; H04W 76/06; H04L 5/0078–5/0089;H04L 5/22; H04L 5/26; H04J 3/16
See application file for complete search history.

(56) References Cited

U.S. PATENT DOCUMENTS

| | | | |
|---|---|---|---|
| 2013/0194980 A1 | 8/2013 | Yin et al. | |
| 2015/0358138 A1* | 12/2015 | Hwang et al. | H04L 5/0055 370/280 |
| 2015/0372798 A1* | 12/2015 | Zhao et al. | H04L 5/14 370/280 |

FOREIGN PATENT DOCUMENTS

WO    2012113131 A1    8/2012

OTHER PUBLICATIONS

3GPP TSG RAN WG1 Meeting #74, Barcelona, Spain, Aug. 19-23, 2013 (R1-133016).
(Continued)

*Primary Examiner* — Timothy J Weidner
(74) *Attorney, Agent, or Firm* — Blue Capital Law Firm, P.C.

(57) ABSTRACT

A method and apparatus are disclosed for DL-UL (Downlink-Uplink) interference management and traffic adaptation. The method includes a UE (User Equipment) being connected with an eNB (evolved Node B), and is configured with a Discontinuous Reception (DRX) operation and an eIMTA operation. The method also includes the UE monitors Physical Downlink Control Channel (PDCCH) in a subframe for a potential scheduling from the eNB when a DRX timer associated with the DRX operation is running, and the UE increments the running DRX timer by one. The method further includes the UE monitors PDCCH in the subframe when the DRX timer is running, and does not increment the DRX timer by one when the subframe is a DL subframe as indicated by an explicit signaling associated with the eIMTA operation.

6 Claims, 9 Drawing Sheets

(51) Int. Cl.
*H04W 56/00* (2009.01)
*H04W 52/02* (2009.01)
*H04W 28/02* (2009.01)
*H04L 5/22* (2006.01)
*H04L 5/00* (2006.01)

(52) U.S. Cl.
CPC ..... *H04W 52/0216* (2013.01); *H04W 56/001* (2013.01); *H04W 76/048* (2013.01)

(56) References Cited

OTHER PUBLICATIONS

Search Report on corresponding EP Patent Application No. 14187735.7 dated Aug. 31, 2015.
3GPP TSG RAN WG2 Meeting#83bis, Ljuljana, Solvenia, Oct. 7-11, 2013 (R2-133222).
3GPP TSG-RAN WG2 Meeting#83bis, Ljuljana, Solvenia, Oct. 7-11, 2013 (R2-132251).
3GPP TSG-RAN WG2 Meeting#83bis, Ljuljana, Solvenia, Oct. 7-11, 2013 (R2-133387).
3GPP TSG-RAN WG2 Meeting#83bis, Ljuljana, Solvenia, Oct. 7-11, 2013 (R2-133528).
3GPP TSG-RAN WG2 Meeting#83bis, Ljuljana, Solvenia, Oct. 7-11, 2013 (R2-133533).
Search Report on corresponding EP Patent Application No. 14187735.7 dated Apr. 20, 2015.

* cited by examiner

METHOD AND APPARATUS FOR DL-UL (DOWNLINK-UPLINK) INTERFERENCE MANAGEMENT AND TRAFFIC ADAPTATION

CROSS-REFERENCE TO RELATED APPLICATIONS

The present Application claims the benefit of U.S. Provisional Patent Application Ser. No. 61/886,814 filed on Oct. 4, 2013, the entire disclosures of which is incorporated herein by reference.

FIELD

This disclosure generally relates to wireless communication networks, and more particularly, to a method and apparatus for DL-UL (Downlink-Uplink) interference management and traffic adaptation.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for DL-UL (Downlink-Uplink) interference management and traffic adaptation. The method includes a UE (User Equipment) being connected with an eNB (evolved Node B), and is configured with a Discontinuous Reception (DRX) operation and an eIMTA operation. The method also includes the UE monitors Physical Downlink Control Channel (PDCCH) in a subframe for a potential scheduling from the eNB when a DRX timer associated with the DRX operation is running, and the UE increments the running DRX timer by one. The method further includes the UE monitors PDCCH in the subframe when the DRX timer is running, and does not increment the DRX timer by one when the subframe is a DL subframe as indicated by an explicit signaling associated with the eIMTA operation.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TR 36.828 v11.0.0, "Evolved Universal Terrestrial Radio Access (E-UTRA); Further enhancements to LTE Time Division Duplex (TDD) for Downlink-Uplink (DL-UL) interference management and traffic adaptation (Release 11)"; R1-133416, "Efficient use of explicit signaling", Ericsson; R1-133582, "DRX operation for eIMTA", Qualcomm; R1-133227, "Enhancements of DL CSI measurements for eIMTA", Sharp; R1-133014, "Design of L1 signaling for UL-DL reconfiguration", CATT; R1-133094, "Signaling for TDD UL-DL Reconfiguration", Samsung; R1-133366, "Details of UL-DL Reconfiguration Message", LG Electronics; and R1-32873, "Physical layer signaling design for TDD eIMTA", Huawei. The standards and documents listed above are hereby expressly incorporated herein.

Figure 1:
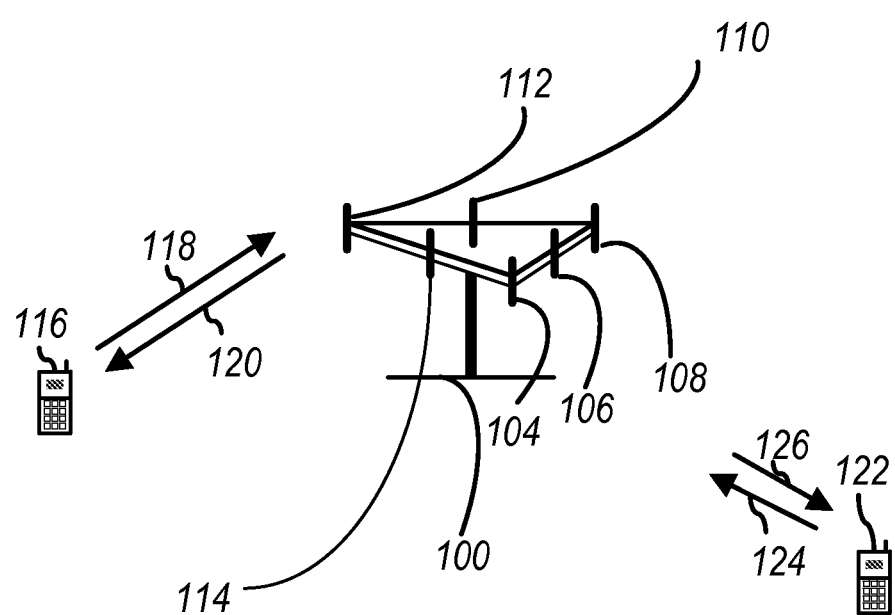
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
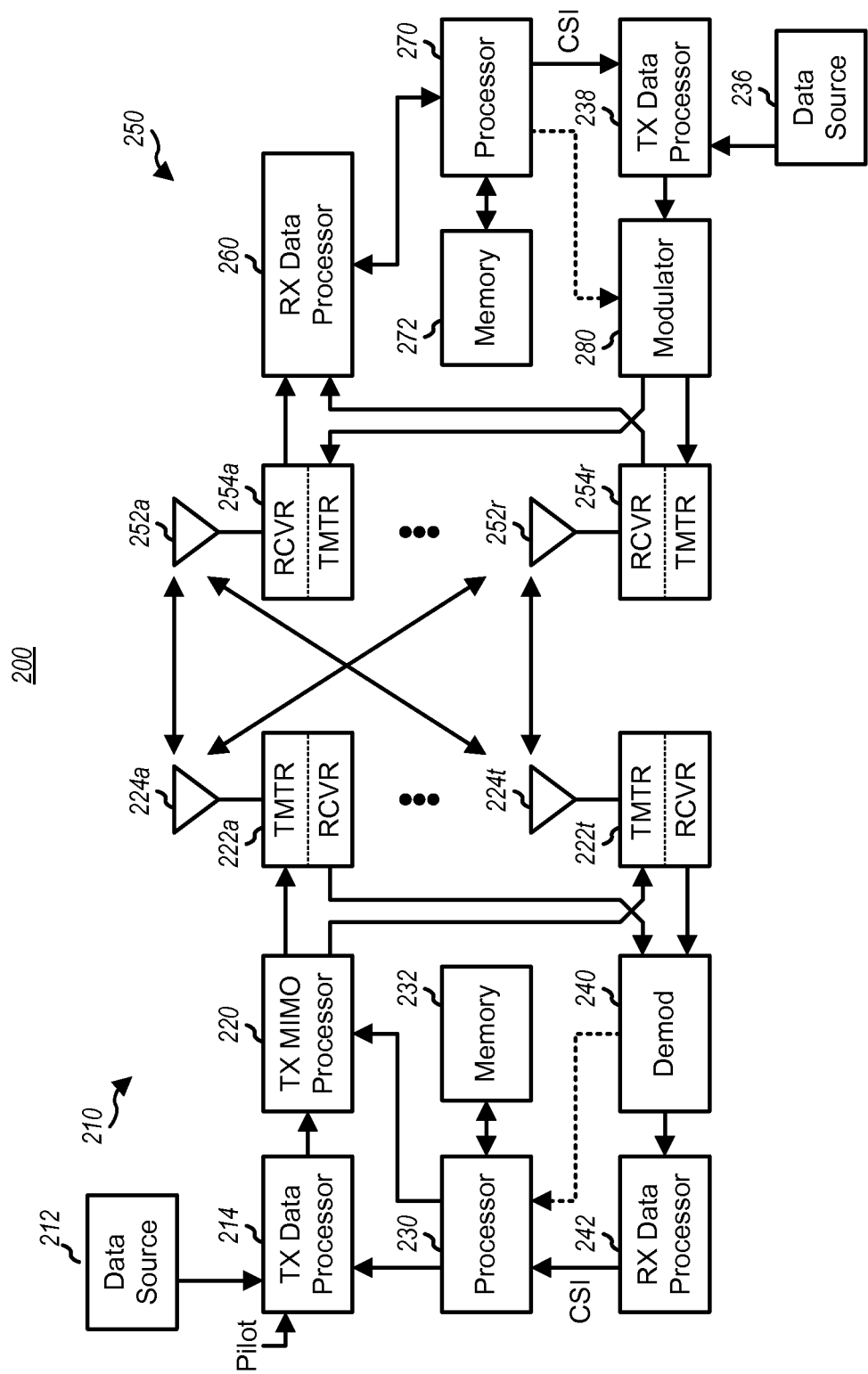
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
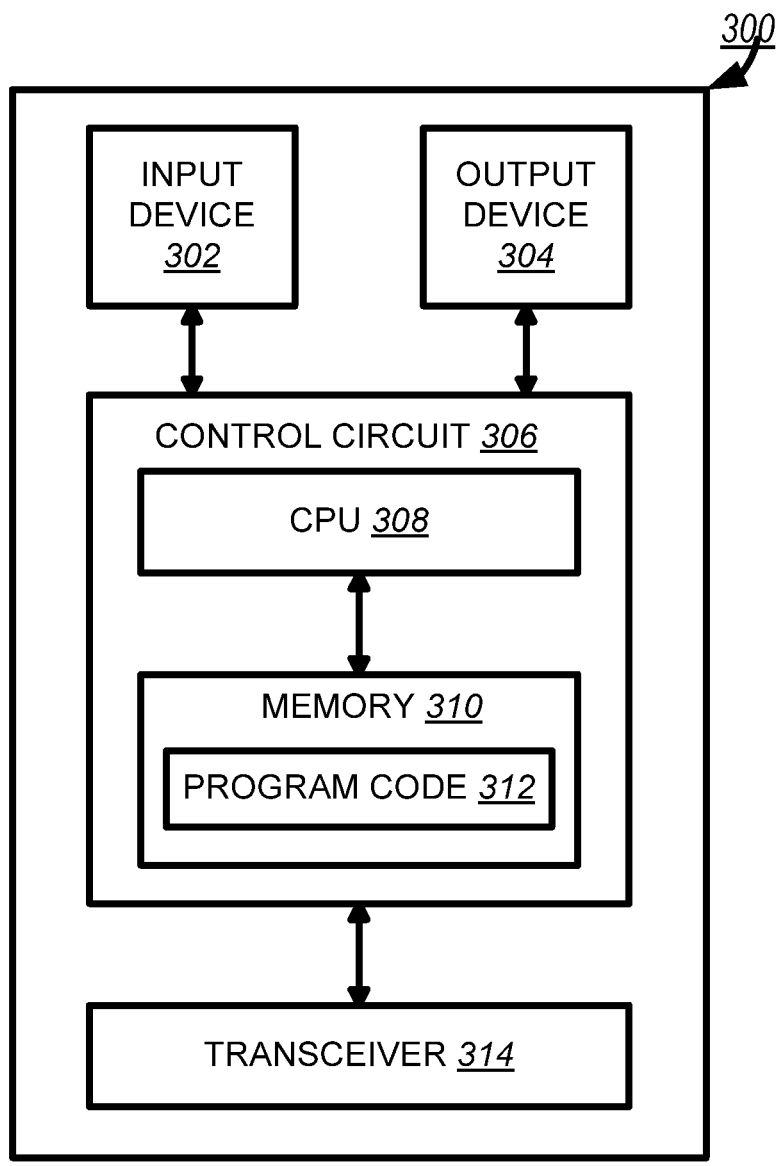
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
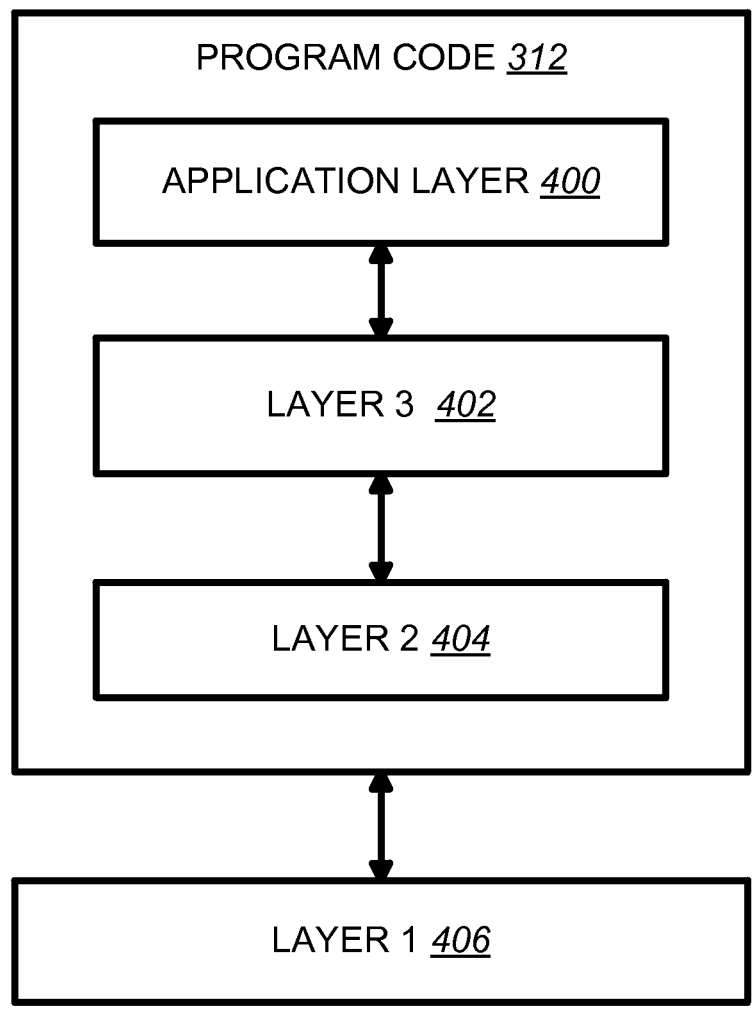
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

TR 36.828 v11.0.0 states:
TDD offers flexible deployments without requiring a pair of spectrum resources. For TDD deployments in general, interference between UL and DL including both basestation-tobasestation and UE-to-UE interference needs to be considered. One example includes layered heterogeneous network deployments, where it may be of interest to consider different uplink-downlink configurations in different cells. Also of interest are deployments involving different carriers deployed by different operators in the same band and employing either the same or different uplink-downlink configurations, where possible interference may include adjacent channel interference as well as co-channel interference such as remote basestation-to-basestation interference.

Currently, LTE TDD allows for asymmetric UL-DL allocations by providing seven different semi-statically configured uplink-downlink configurations. These allocations can provide between 40% and 90% DL subframes. The semi-static allocation may or may not match the instantaneous traffic situation. The current mechanism for adapting UL-DL allocation is based on the system information change procedure. Additional mechanisms could include e.g. dynamic allocation of subframes to UL or DL.

It is still open when to apply the change upon detection of PDCCH (Physical Downlink Control Channel) of the L1 signaling (for example, immediately in the current radio frame or later in the next radio frame). The duration of the dynamic TDD (Time Division Duplex) change could be tens or hundreds ms (e.g., 10 ms to 640 ms).

3GPP R1-133416 states:

2 Discussion

In the following, we give a list of UE functionalities/procedures that will be impacted by the TDD configuration and provide our analysis and recommendations on the efficient use of explicit signaling in Table 1.

TABLE 1

| UE functionalities/procedures and impact of explicit signaling ||| 
|---|---|---|
| UE functionalities and procedures | What will be impacted by TDD configuration? | Should it be impacted by explicit signaling or not? |
| Random Access | PRACH resource MSG2/3/4 transmission timing | Explicit signaling is only monitored when dynamic TDD is configured. For initial access, MSG1/2/3/4 should not be impacted by explicit signaling. For UEs in RRC_CONNECTED state, but not uplink-synchronized, marginal benefit is expected if MSG2/3/4 transmission follow explicit signaling. |
| . . . | . . . | . . . |
| PUCCH | HARQ-ACK resource allocation SR and CSI transmission | It is strongly preferred PUCCH HARQ-ACK resource allocation follows a DL reference TDD configuration thus not impacted by explicit signaling, see Error! Reference source not found.. PUCCH UCI should only be transmitted in uplink subframes. Utilization of periodic resources assigned to reconfigurable subframes should follow the explicit signaling. |
| DRX | Subframes that is counted in DRX timers UE active/ sleep state | Explicit signaling should be read by UEs in active mode, i.e. UEs in DRX sleep mode is not mandated to read the explicit signaling. It is preferred UE DRX behavior is not impacted by explicit signaling to provide predictability of UE DRX state. |
| . . . | . . . | . . . |

TABLE 1-continued

| UE functionalities/procedures and impact of explicit signaling ||| 
|---|---|---|
| UE functionalities and procedures | What will be impacted by TDD configuration? | Should it be impacted by explicit signaling or not? |
| Uplink SPS | Subframe offset value used when two intervals are configured | To enable DRX during SPS and to avoid unnecessary complexity it is preferred that uplink SPS is independent of explicit signaling |
| . . . | . . . | . . . |

Based on 3GPP 133852, in order to maintain sync-up with UE, eNB could typically set UE to always wake up in anchor downlink subframes so that UE could timely receive TDD reconfiguration indicator. Furthermore, some of the DRX timers could be redefined. In particular, onDurationTimer/drx-InactivityTimer could redefined as only counting the anchor downlink subframes.

In addition, 3GPP R1-133227 states:

2 Discussion 2.1 The Number of Downlink Subframe Sets

In the last meeting, it was agreed that subframe sets can be configured and separate CSI measurement/reporting for each subframe sets. In this contribution, we evaluate the throughput performance in order to determine the number of DL subframe sets for CSI measurements/reporting. In this evaluation, we assume all the TDD UL-DL configurations can be used in pico cell layer and fixed configuration (configuration #1) is used for macro layer in scenario 4.

Figure 5:
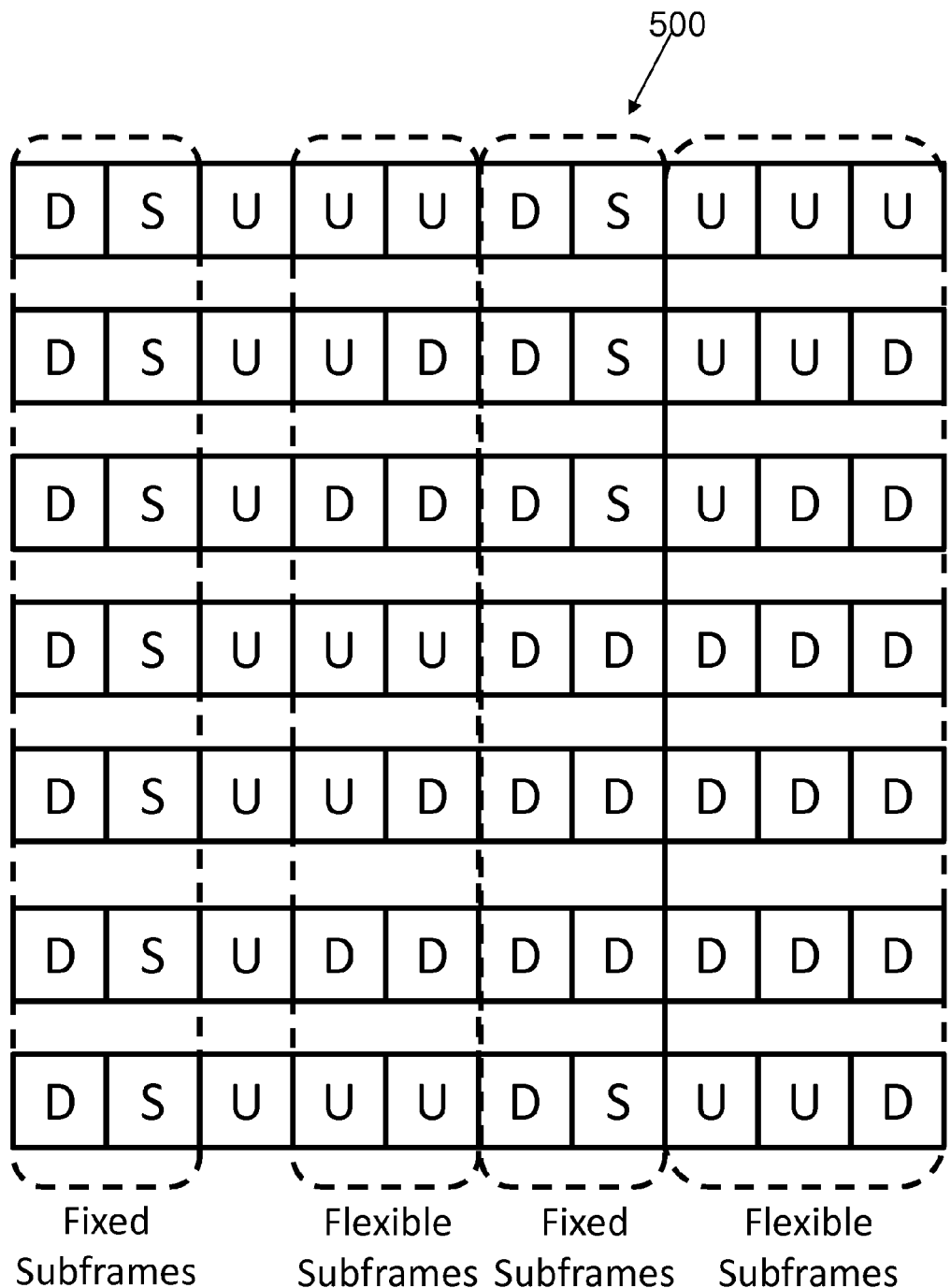
FIG. 5 is a reproduction of FIG. 1 entitled "Subframe types" of Section 2.1 of 3GPP R1-133227 according to one exemplary embodiment.

Here, we should define the fixed subframes and flexible subframes in this evaluation. [FIG. 5] shows the TDD-DL configurations specified in Rel-8. We can categorize two subframe types.

[FIG. 1 entitled "Subframe types" has been reproduced as FIG. 5]

1. Fixed DL subframes
    These subframes are the subframes in which the transmission directions are always downlink regardless of the TDD UL-DL configuration.
2. Flexible DL subframes
    These subframes are the subframes in which the transmission directions can be switched between downlink and uplink by explicit L1 signalling.

In the evaluations, we evaluate the throughput performances when the number of DL subframe sets is two or three.

Furthermore, 3GPP R1-133014 states:

2.4 Subframe Location for the L1 Signaling

L1 signaling for UL-DL reconfiguration can be transmitted in a subframe fixed in the specification (e.g. subframe #0) or configured by the eNB. The first option is beneficial in that the indicated UL-DL configuration can be used by the UE in the same radio frame if it is transmitted in the SF#0. The latter can be beneficial in reducing CSS blocking probability if multiple DC's are required to indicate UL-DL configurations.

Proposal 6:

Decision on the subframe location for the L1 signaling depends on the DCI and search space design.

Also, 3GPP R1-133094 states:

Given the small/moderate number of UEs configured for eIMTA, the infrequent transmission of HARQ-ACK signaling (e.g. once every ~40 msec or more), and a multiplexing of 18 or 36 HARQ-ACK signal transmissions in a single PRB, the overhead is rather trivial (e.g. 0.05% for 40 msec periodicity at 10 MHz).

In addition, 3GPP R1-133366 states:
The new DCI for UL-DL reconfiguration is not expected to be transmitted in every DL subframe because the maximum rate of reconfiguration is once in 10 ms. Thus, it needs to be defined which subframe is used for the transmission of this new DCI, and the UE does not need to monitor it in the other DL subframes to avoid unnecessary false alarm. Basically, the UL-DL reconfiguration speed is dependent of various factors such as the backhaul link speed, the adopted ICIC schemes, the expected traffic fluctuations, and the portion of legacy UEs that are unable to understand this configuration change. Given that the UL-DL reconfiguration using L1 signaling is already something UE-specifically configured even for the Rel-11 UEs, it seems beneficial to allow the network configurability in determining the subframes where the reconfiguration DCI is transmitted. In other words, each eNB can configure the period and offset of the subframes for the reconfiguration DCI transmission. The period can be determined based on the reconfiguration speed considering the above-mentioned factors. The offset can be determined such that the reconfiguration DCI transmission can avoid inter-cell interference, e.g., by considering ABS configuration of the neighboring cells or by staggering the reconfiguration signal subframes in neighboring cells.
Proposal 3: eNB Configures the Period and Offset of the Subframes Used for the Transmission of the New DCI for UL-DL Reconfiguration.

As seen, since the reconfiguration signal needs to be transmitted only in a few subframes (at most once in 10 ms), using CSS (CSG (Closed Subscriber Group) Subscriber Server) seems sufficient for reconfiguration purposes.

Furthermore, 3GPP R1-132873 states:
3. Configuration Modification Procedure
Due to the bursty traffic model, the traffic load sometimes fluctuates rapidly and sometimes fluctuates slowly, it is beneficial to allow an eNB to adjust different reconfiguration duration adaptively to efficiently control the overhead of common control signaling. When traffic fluctuates fast, eNB can configure a 10 ms reconfiguration duration for the common signaling transmission. When traffic fluctuates slowly, eNB can configure larger reconfiguration duration, and UE can monitor PDCCH in fewer subframes which is beneficial for reducing false alarm of PDCCH. As shown in [FIG. 6], the UEs receive the cell common PDCCH before the reconfiguration time instance.

In addition, as discussed in [3], we can find that the reliability of PDCCH is worse than MAC, RRC, or PBCH signaling. In order to improve signaling reliability of PDCCH, the PDCCH for indicating UL-DL configuration can be repeated several times (e.g. repeat twice) before reconfiguration time instance.

Figure 6:
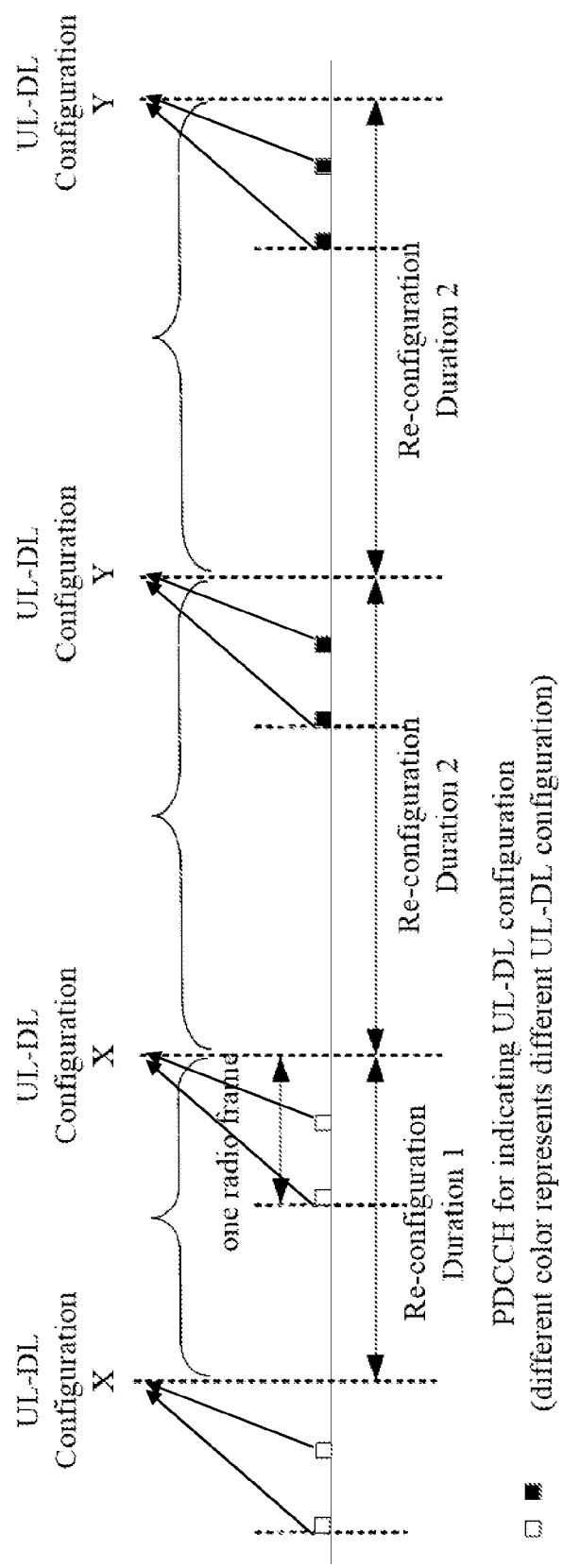
FIG. 6 is a reproduction of FIG. 1 entitled "Configuration modification procedure" of Section 3 of 3GPP R1-132873 according to one exemplary embodiment.

[FIG. 1 entitled "Configuration modification procedure" has been reproduced as FIG. 6]

As seen, the duration looks different so not just periodic duration is considered. In one embodiment, one or more bits in the L1 signaling could be used to indicate which duration is used.

In one embodiment, from the perspective of SR (Schedule Request) in the MAC layer, the UE may need to wake up earlier to detect if the uplink subframe used for SR transmission is changed so that the UE would know which subframe SR should be sent. Furthermore, consideration should be given as to whether there is valid PUCCH resource for SR or not.

In one embodiment, for both non-Carrier-Aggregation (CA) as well as CA cases in the context of DRX (Discontinuous Reception), timer counting would follow the reference configuration, which could be included in the broadcast system information or in a dedicated RRC (Radio Resource Control) message. Furthermore, PDCCH monitoring would follow the L1 explicit signaling to change the TDD configuration.

In some cases, the UE may increment a timer counter for a subframe, but may not monitor PDCCH in the subframe because the subframe would be a UL subframe that includes no PDCCH signaling such that the UE would not need to monitor PDCCH.

Also, in some cases, the UE may not increment a timer counter for a subframe, but may monitor PDCCH in the subframe because the subframe would be a DL subframe that may include PDCCH signaling such that the UE would need to monitor the PDCCH. Furthermore, the UE may increment a timer counter for a subframe upon detection of PDCCH in the subframe if the subframe is not used for counting before the start of the monitoring PDCCH of the subframe.

In addition to PDCCH monitoring and DRX timer counting in DRX operation described above, the relevant Timing Alignment operations would need to be considered. From the UE perspective, if DL or UL traffic is coming, TDD configuration may need to be changed based on the traffic condition. However, if there is no traffic in the near future from the UE's perspective, it seems that there would be no need for the UE to check whether the TDD configuration has been changed by the eNB.

From the eNB perspective, the traffic of all or a group of UEs should be considered in deciding how and whether to change TDD configuration for these UEs. Although eNB might change TDD configuration based on the traffic condition of many UEs, a UE may not be able to apply or follow the changed/new TDD configuration. For example, the UE would consider dynamic TDD configuration changes as not configured or temporarily unused if any combination of the following conditions occurs:
  (i) UE is or becomes UL unsynchronized; and/or
  (ii) There is no PUCCH (Physical Uplink Control Channel), or the PUCCH has been released.

As another example, the UE would consider dynamic TDD configuration change as configured or used if any combination of the following conditions occurs:
  (i) the start of the RACH (Random Access Channel) procedure, such as upon reception of a PDCCH order or a SR over RACH;
  (ii) the middle of the RACH procedure, such as upon doing some specific action or step like transmitting, detecting, and/or receiving information; or
  (iii) the end of the RACH procedure, such as upon completion or failure of procedure.

Figure 7:
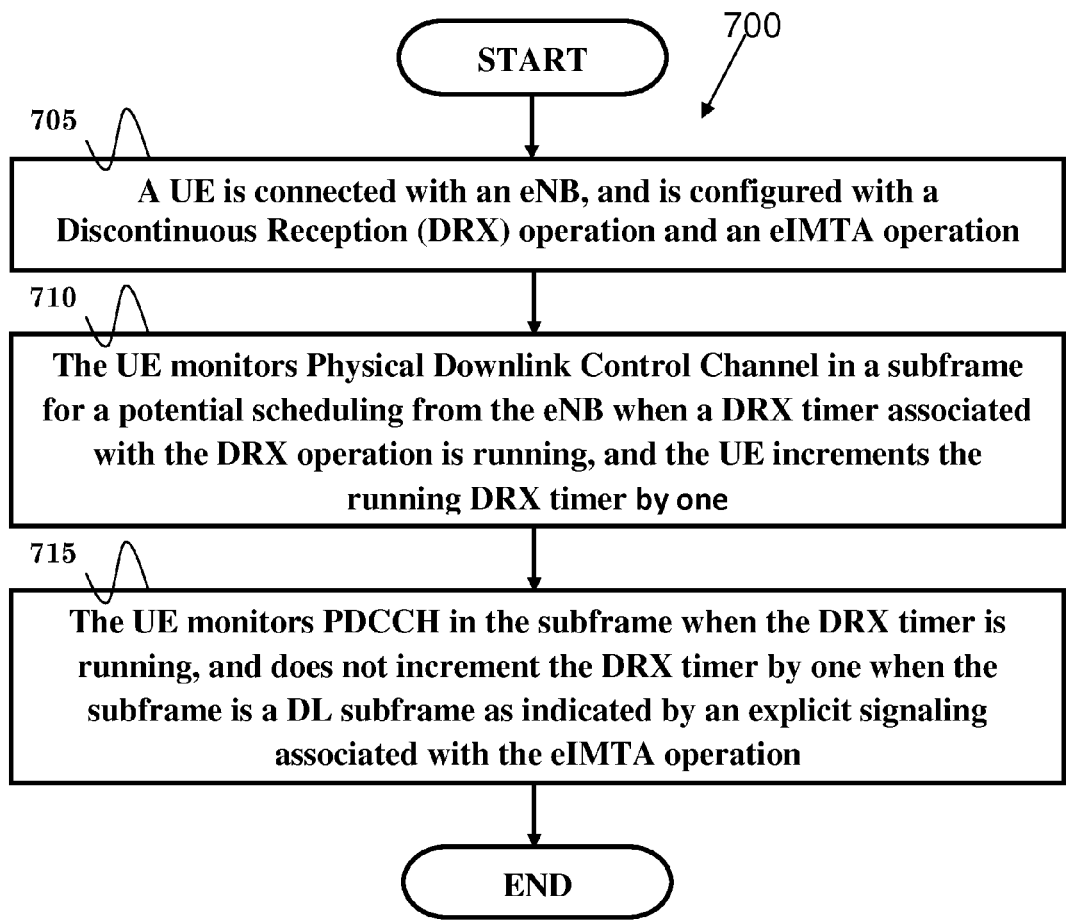
FIG. 7 is a flow chart according to one exemplary embodiment.

FIG. 7 is a flow chart in accordance with one exemplary embodiment. In step 705, a UE (User Equipment) is connected with an eNB (evolved Node B), and is configured with a Discontinuous Reception (DRX) operation and an eIMTA operation. In step 710, the UE monitors Physical Downlink Control Channel (PDCCH) in a subframe for a potential scheduling from the eNB when a DRX timer associated with the DRX operation is running, and the UE increments the running DRX timer by one. In step 715, the UE monitors PDCCH in the subframe when the DRX timer is running, and does not increment the DRX timer by one when the subframe is a DL subframe as indicated by an explicit signaling associated with the eIMTA operation.

In one embodiment, the DRX timer could be either an onDurationTimer or a drx-InactivityTimer. Furthermore, the explicit signaling associated with the eIMTA operation is a Layer 1 signaling such as a PDCCH signaling.

Referring back to FIGS. 3 and 4, the device 300 includes a program code 312 stored in memory 310. In one embodiment, the CPU 308 could execute program code 312 (i) to connect a UE with an eNB, and to configure the UE with a Timing Alignment operation and an eIMTA operation, (ii) to monitor Physical Downlink Control Channel (PDCCH) in a subframe for a potential scheduling from the eNB when a DRX timer associated with the DRX operation is running, and to increment the running DRX timer by one, and (iii) to monitor PDCCH in the subframe when the DRX timer is running, and not increment the DRX timer by one when the subframe is a DL subframe as indicated by an explicit signaling associated with the eIMTA operation.

In addition, the CPU 308 can execute the program code 312 to perform all of the above-described actions and steps or others described herein.

Figure 8:
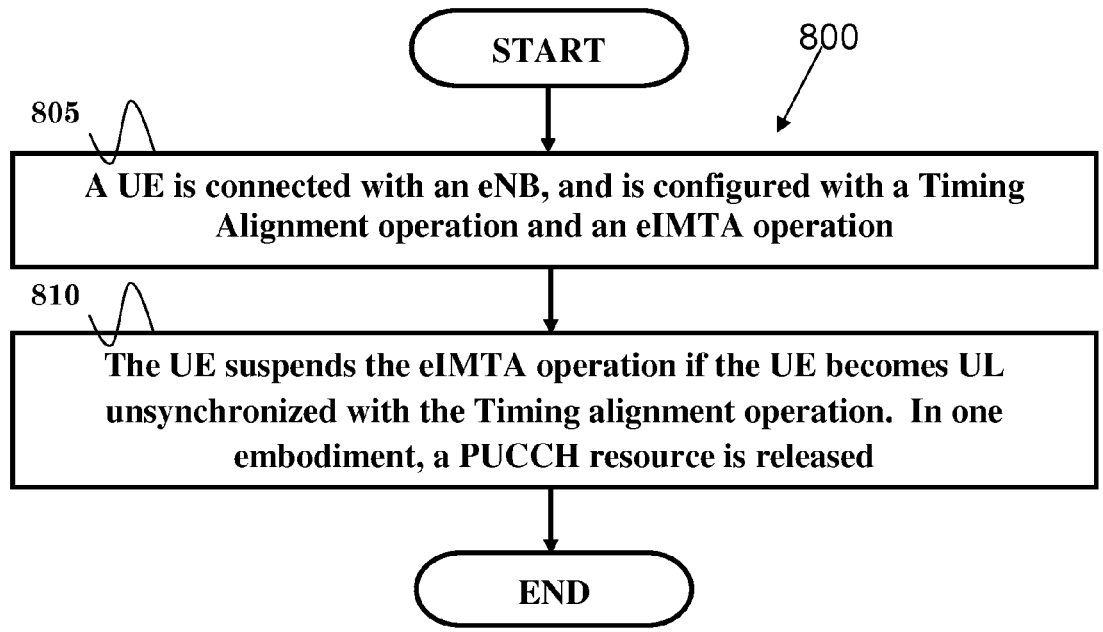
FIG. 8 is a flow chart according to one exemplary embodiment.

FIG. 8 is a flow chart in accordance with an exemplary embodiment. In step 805, a UE is connected with an eNB, and is configured with a Timing Alignment operation and an eIMTA operation. In step 810, the UE suspends the eIMTA operation if the UE becomes UL unsynchronized with the Timing alignment operation. In one embodiment, a PUCCH resource is released.

Referring back to FIGS. 3 and 4, the device 300 includes a program code 312 stored in memory 310. In one embodiment, the CPU 308 could execute program code 312 (i) to connect a UE with an eNB, and to configure the UE with a Timing Alignment operation and an eIMTA operation, and (ii) to suspend the eIMTA operation if the UE becomes UL unsynchronized with the Timing Alignment operation.

In addition, the CPU 308 can execute the program code 312 to perform all of the above-described actions and steps or others described herein.

Figure 9:
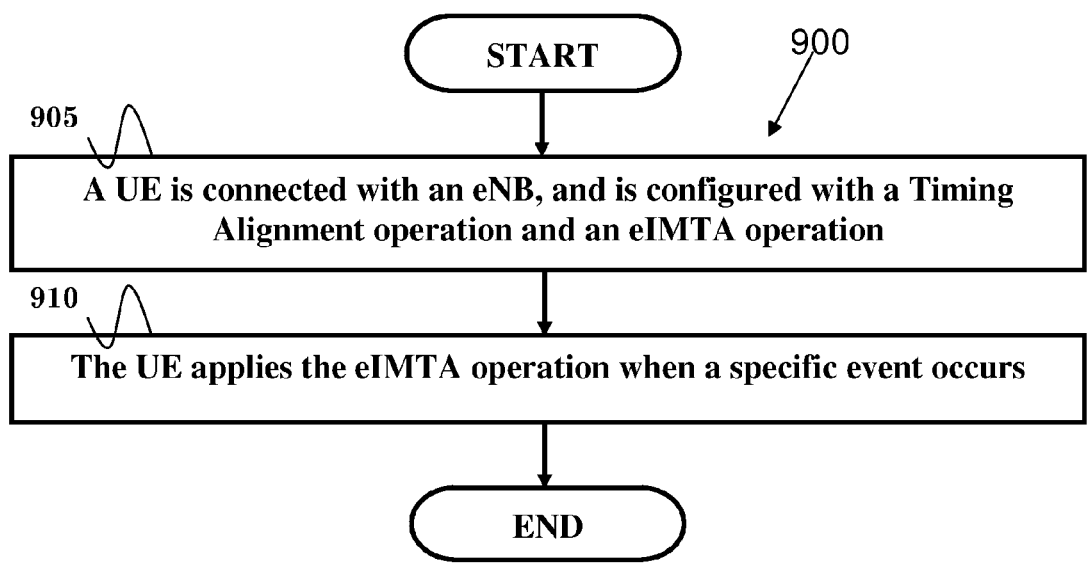
FIG. 9 is a flow chart according to one exemplary embodiment.

FIG. 9 is a flow chart in accordance with one exemplary embodiment. In Step 905, a UE is connected with an eNB, and is configured with a Timing Alignment operation and an eIMTA operation. In step 910, the UE applies the eIMTA operation when a specific event occurs. In one embodiment, the specific event could be a transmission of a scheduling request (SR), a reception of PDCCH order, a transmission or reception of a message within a Random Access (RA) Procedure, or a performing of a Random Access Procedure.

Referring back to FIGS. 3 and 4, the device 300 includes a program code 312 stored in memory 310. In one embodiment, the CPU 308 could execute program code 312 (i) to connect a UE with an eNB, and to configure the UE with a Timing Alignment operation and an eIMTA operation, and (ii) to apply the eIMTA operation when a specific event occurs.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for enhanced DL-UL (Downlink-Uplink) interference management and traffic adaptation (eIMTA), comprising:
   a UE (User Equipment) is connected with an eNB (evolved Node B), and is configured with a Discontinuous Reception (DRX) operation and an eIMTA operation;
   the UE monitors Physical Downlink Control Channel (PDCCH) in a subframe for a potential scheduling from the eNB when a DRX timer associated with the DRX operation is running, and the UE increments the running DRX timer by one; and
   the UE monitors PDCCH in the subframe when the DRX timer is running, and does not increment the DRX timer by one when the subframe is a DL subframe as indicated by an explicit signaling associated with the eIMTA operation.

2. The method of claim 1, wherein the DRX timer is an onDurationTimer or a drx-InactivityTimer.

3. The method of claim 1, wherein the explicit signaling associated with the eIMTA operation is a Layer 1 signaling such as a PDCCH signaling.

4. A UE (User Equipment) for enhanced DL-UL (Downlink-Uplink) interference management and traffic adaptation (eIMTA), wherein the UE is connected with an eNB (evolved Node B) and is configured with a Discontinuous Reception (DRX) operation and an eIMTA operation, the UE comprising:
   a control circuit;
   a processor installed in the control circuit;
   a memory installed in the control circuit and operatively coupled to the processor;
   wherein the processor is configured to execute a program code stored in the memory for enhanced DL-UL interference management and traffic adaptation by:
   monitoring Physical Downlink Control Channel (PDCCH) in a subframe for a potential scheduling from the eNB when a DRX timer associated with the DRX operation is running, and incrementing the running DRX timer by one; and
   monitoring PDCCH in the subframe when the DRX timer is running, and not incrementing the DRX timer by one when the subframe is a DL subframe as indicated by an explicit signaling associated with the eIMTA operation.

5. The UE of claim 4, wherein the DRX timer is an onDurationTimer or a drx-InactivityTimer.

6. The UE of claim 4, wherein the explicit signaling associated with the eIMTA operation is a Layer 1 signaling such as a PDCCH signaling.

* * * * *